US011562047B2

(12) United States Patent
Rashid et al.

(10) Patent No.: US 11,562,047 B2
(45) Date of Patent: Jan. 24, 2023

(54) ACCELERATOR FOR DENSE AND SPARSE MATRIX COMPUTATIONS

(71) Applicant: Microsoft Technology Licensing, LLC, Redmond, WA (US)

(72) Inventors: Layali Rashid, Issaquah, WA (US); Saurabh M. Kulkarni, Redmond, WA (US); Marc Tremblay, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 316 days.

(21) Appl. No.: 16/862,370

(22) Filed: Apr. 29, 2020

(65) Prior Publication Data
US 2021/0240797 A1    Aug. 5, 2021

Related U.S. Application Data

(60) Provisional application No. 62/968,867, filed on Jan. 31, 2020.

(51) Int. Cl.
*G06F 17/16*    (2006.01)
*G06F 9/30*    (2018.01)
(Continued)

(52) U.S. Cl.
CPC ............ *G06F 17/16* (2013.01); *G06F 9/3001* (2013.01); *G06F 9/30036* (2013.01);
(Continued)

(58) Field of Classification Search
None
See application file for complete search history.

(56) References Cited

U.S. PATENT DOCUMENTS 10,409,887 B1*  9/2019 Gauria ............... G06F 12/0646
2015/0378962 A1* 12/2015 Golovashkin ........ G06K 9/6267
                                                         708/607
(Continued)

FOREIGN PATENT DOCUMENTS

EP        3343391 A1    7/2018
EP        3396533 A2   10/2018

OTHER PUBLICATIONS

"Sparse Matrix", Retrieved from: https://en.wikipedia.org/wiki/Sparse_matrix, Retrieved on Jan. 15, 2020, 8 Pages.
(Continued)

*Primary Examiner* — Eric Coleman
(74) *Attorney, Agent, or Firm* — Alleman Hall Creasman & Tuttle LLP

(57) ABSTRACT

A method of increasing computer hardware efficiency of a matrix computation. The method comprises receiving at a computer processing device, digital signals encoding one or more operations of the matrix computation, each operation including one or more operands. The method further comprises, responsive to determining, by a sparse data check device of the computer processing machine, that an operation of the matrix computation includes all dense operands, forwarding the operation to a dense computation device of the computer processing machine configured to perform the operation of the matrix computation based on the dense operands. The method further comprises, responsive to determining, by the sparse data check device, that an operation of the matrix computation includes one or more sparse operands, forwarding the operation to a sparse computation device configured to perform the operation of the matrix computation.

20 Claims, 5 Drawing Sheets

(51) Int. Cl.
    *G06N 3/063* (2006.01)
    *G06F 9/38* (2018.01)

(52) U.S. Cl.
    CPC ........ *G06F 9/30076* (2013.01); *G06F 9/3836* (2013.01); *G06N 3/063* (2013.01)

(56) References Cited

U.S. PATENT DOCUMENTS

| | | | |
|---|---|---|---|
| 2018/0046900 A1* | 2/2018 | Dally | G06F 9/30018 |
| 2018/0164866 A1* | 6/2018 | Turakhia | G06N 3/02 |
| 2018/0189056 A1* | 7/2018 | Turakhia | G06F 9/3001 |
| 2018/0349290 A1* | 12/2018 | Staudenmaier | G06F 13/28 |
| 2019/0205358 A1 | 7/2019 | Diril et al. | |
| 2019/0347256 A1* | 11/2019 | Wu | G06F 16/2462 |

OTHER PUBLICATIONS

Han, et al., "EIE: Efficient Inference Engine on Compressed Deep Neural Network", In Proceedings of the ACM/IEEE 43rd Annual International Symposium on Computer Architecture, Jun. 18, 2016, pp. 243-254.

Parashar, et al., "SCNN: An Accelerator for Compressed-Sparse Convolutional Neural Networks", In Proceedings of the International Symposium on Computer Architecture, Jun. 24, 2017, pp. 27-40.

Yuan, et al., "STICKER: An Energy-Efficient Multi-Sparsity Compatible Accelerator for Convolutional Neural Networks in 65-nm CMOS", In IEEE Journal of Solid-State Circuits, vol. 55, No. 2, Feb. 2020, pp. 465-476.

Zhang, et al., "Cambricon-X: An accelerator for Sparse Neural Networks", In Proceedings 49th Annual IEEE/ACM International Symposium on Microarchitecture, Oct. 15, 2016, 12 Pages.

"International Search Report and Written Opinion Issued in PCT Application No. PCT/US21/014055", dated Apr. 30, 2021, 14 Pages.

\* cited by examiner

ACCELERATOR FOR DENSE AND SPARSE MATRIX COMPUTATIONS

CROSS REFERENCE TO RELATED APPLICATIONS

This application claims priority to U.S. Provisional Patent Application Ser. No. 62/968,867, filed Jan. 31, 2020, the entirety of which is hereby incorporated herein by reference for all purposes.

BACKGROUND

Matrix computations may be accelerated with specialized computing hardware. However, such specialized computing hardware is often inefficient at performing matrix computations having a substantial proportion of zero-valued elements.

SUMMARY

Figure 1A:
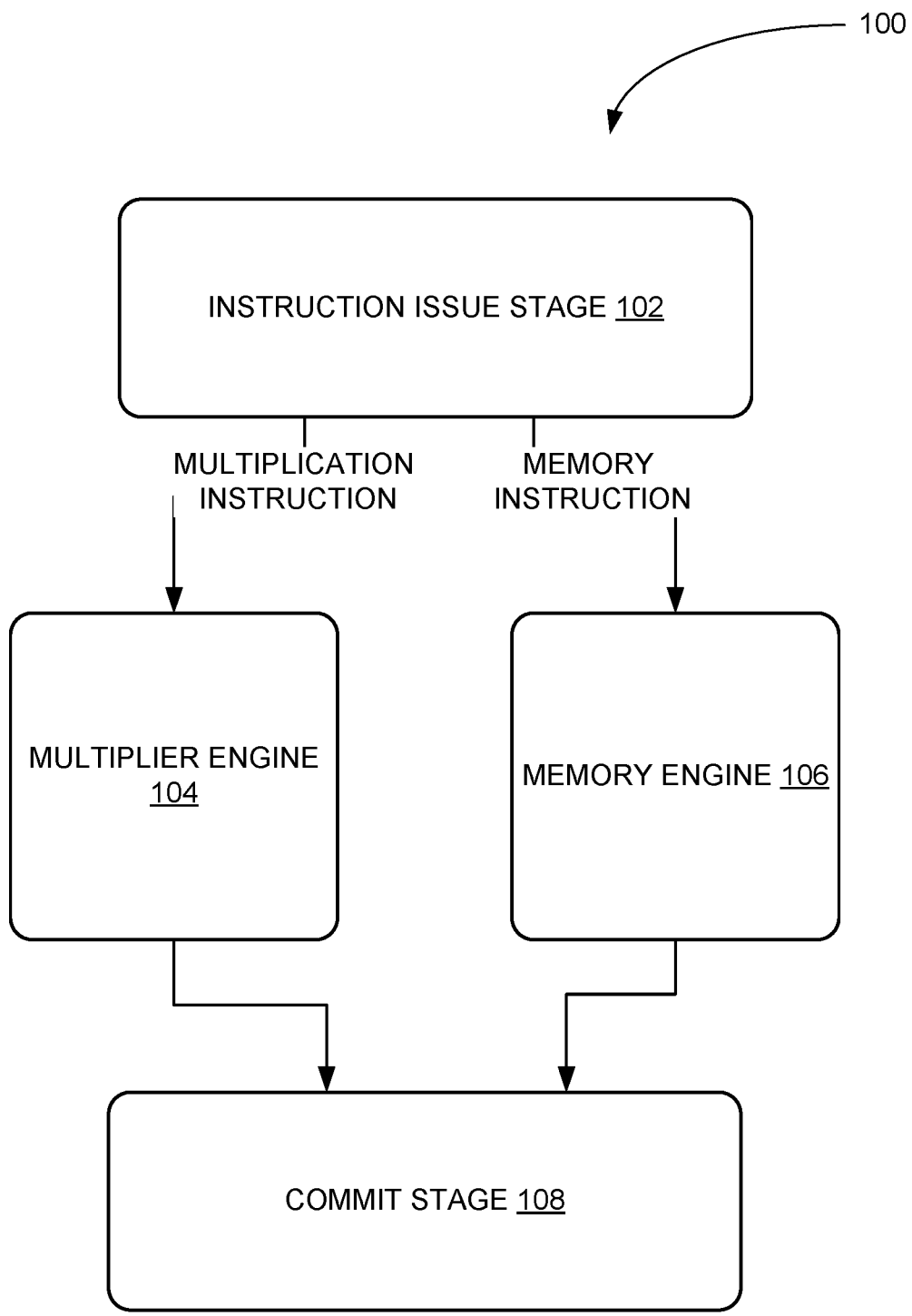
FIGS. 1A-1B show exemplary accelerator pipelines for matrix computations.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method of increasing computer hardware efficiency of a matrix computation comprises receiving at a computer processing device, digital signals encoding one or more operations of the matrix computation, each operation including one or more operands. Responsive to determining, by a sparse data check device of the computer processing machine, that an operation of the matrix computation includes all dense operands, the operation is forwarded to a dense computation device of the computer processing machine configured to perform the operation of the matrix computation based on the dense operands. Responsive to determining, by the sparse data check device, that an operation of the matrix computation includes one or more sparse operands, the operation is forwarded to a sparse computation device configured to perform the operation of the matrix computation.

DETAILED DESCRIPTION

Computer calculations often include matrix computations, for example matrix multiplications. For example, neural networks (e.g., convolutional neural networks and/or deep neural networks) may be implemented with one or more matrix multiplications. Accordingly, an accelerator may perform one or more matrix multiplications, thereby providing myriad benefits (e.g., lower latency, higher bandwidth, and/or lower power utilization) for the neural network implementation. Non-limiting examples of computer programs and/or algorithms that can be substantially implemented using matrix calculations include graphics processing programs (e.g., rendering software), and artificial intelligence models, such as: deep neural networks (DNN), convolutional neural networks (CNN; e.g. Deep Convolutional Neural Networks (DCNN)), recurrent neural networks (RNN; e.g., long short-term memory (LSTM)), among many other artificial intelligence models. These artificial intelligence models can be implemented using multiple layers of matrix calculations that start with an input vector and process the input vector at each layer of matrix calculation to calculate arbitrary functions, e.g., functions learned using machine learning training algorithms. Neural networks utilizing such matrix calculations are capable of achieving state-of-the-art results in many applications such as computer vision, machine translation, voice assistance, etc. As one example of a neural network model that can be substantially implemented using matrix computations, CNNs can include multiple layers that can be mathematically decomposed as massive matrix multiplications (convolutions), followed by elementwise non-linear transformations such as sigmoid or rectified linear device functions. As another example, DNNs can perform a large plurality of matrix computations.

However, matrix computations may involve large computational runtime cost, memory, and power consumption. For example, a neural network for processing image data (e.g., photographic data, video data, and the like) may perform many hundreds or thousands of arithmetic operations just to process a single image. As another example, existing neural networks can have more than 100 layers, where processing each layer includes performing many hundreds or even thousands of arithmetic operations.

Runtime cost, memory utilization, processing time, and power consumption of matrix computations potentially may be reduced using specialized computing hardware. Specialized computing hardware may substantially reduce these costs relative to sequential computations, e.g., matrix computations using conventional, general-purpose computing hardware. For example, as compared to a general-purpose processor, the accelerator may achieve benefits such as lower latency, higher bandwidth, and/or lower power utilization.

In some examples, such specialized computing hardware may perform computations organized in a pipeline. For example, as shown in FIG. 1A, accelerator pipeline 100 is a non-limiting example of a pipeline for data-flow and logic in matrix computations. For example, accelerator pipeline 100 includes an instruction issue stage 102 at which instructions are received (e.g., issued from a different logic device, and/or streamed from a storage device). Multiplication instructions are sent to a multiplier engine 104. Similarly, memory instructions (e.g., load/store instructions) are sent to a memory engine 106. Instructions are completed in a defined order in the pipeline (e.g., in program order, according to control and/or data dependencies, and/or in any other suitable order that induces a suitable semantics for the matrix operation), and results of instructions are finalized in a commit stage 108 (e.g., by writing computation results into registers and/or causing one or more storage devices to be updated so as to perform load/store operations processed by the memory engine). At each cycle, a number of instructions are issued (e.g., read from the instruction memory and assigned to pipelines that match their type). The number of instructions per cycle is referred to as issue bandwidth. In the following cycles, each instruction is processed in the pipeline by reading the instruction's operands' values from a register file, executing the instruction using its designated engine, and writing results into a register and/or storing data via the memory engine 106. After reaching the commit stage 108, the instruction is marked as executed and no longer has a presence in the pipeline.

As one non-limiting example of a general design for an accelerator, the accelerator may calculate matrix computations asynchronously, concurrently, and/or substantially in parallel to reduce runtime cost. For example, logic hardware may perform steps of a matrix computation in a scheduled fashion to achieve efficient data flow throughout the computation. For example, an efficient parallel implementation may ensure that input data are accessed from memory in an optimal order when needed. Efficient parallel implementation may solve sub-problems of a matrix computation to exploit spatial and/or temporal locality, reducing memory accesses and computational latency. Another non-limiting example of specialized computing hardware for matrix computation is a systolic array (SA) for matrix multiplications. A systolic array for matrix multiplications can be implemented as a plurality of tightly-coupled 2D Multiply-Accumulate (MAC) computational nodes that are highly synchronized to process data as the data arrives in the systolic array in synchronization with a schedule (e.g., a clock). The matrix multiplication may be decomposed into local operations for computing portions of the matrix multiplication product. The matrix multiplication may be decomposed in any suitable fashion, e.g., by computing block portions of the matrix, successive diagonals of the matrix, etc. Accordingly, in an SA for matrix multiplications, 2D MAC computational nodes may be configured to perform a matrix multiplication decomposed into local operations, using only nearest-neighbor communications between MAC computational nodes. The local operations may be computed using only the input data and/or intermediate calculated values that are required for the local operation. Accordingly, the SA for matrix multiplications may reduce (e.g., minimize) memory access latencies and/or power consumption. For example, connections between non-local computational nodes may represent a large potential power cost. By exclusively using local connections, SA for matrix multiplications may substantially reduce power consumption relative to sequential matrix computations. As a non-limiting example, an SA for matrix multiplication may perform a series of multiple operations representing particular elementwise products in a matrix multiplication, and a series of accumulation (e.g., addition) operations to add up the elementwise products and save resulting sums in appropriate memory destinations corresponding to an output matrix resulting from the matrix multiplication. The multiplications and additions may be performed asynchronously (e.g., multiplications may be performed currently and/or in parallel as input data is available, and additions may be performed concurrently and/or in parallel as multiplication products are produced by the ongoing series of multiplication operations).

In addition to matrix multiplications, accelerators (e.g., systolic array-based accelerators) may be configured to perform a wide variety of other matrix computations. Non-limiting examples of matrix computations which may be implemented at least partially via an accelerator include principle component analysis (PCA), Fourier transform, and/or matrix addition and subtraction. Furthermore, matrix computations as described herein may also refer to generalized tensor computations (e.g., vector computations and higher tensor computations) which may be similarly implemented using specialized computing hardware for performing scheduled computations. For example, non-limiting examples of vector/matrix/tensor computations that may be implemented efficiently using the techniques of the present disclosure include pooling operations (e.g., max pooling), Hadamard product operations, etc.

Returning to the example of matrix multiplication, typical systolic arrays are designed for dense matrix operations, e.g., dense multiplication. "Dense matrix" is used herein to refer to matrices in which all elements are explicitly defined, including elements with zero values. Dense matrices may have a memory consumption for storage that depends on the size of the matrix dimensions (e.g., 2×2, 3×3, etc.), since every element of the matrix is explicitly defined and stored. Storing and computing with dense matrices may be particularly efficient when the matrices include relatively few zero elements.

However, inputs to matrix computations often include many zero-valued elements. For example, data with 50% or more zero-valued elements may be referred to as sparse data. When data in a computation (e.g., in an AI and/or DNN computation) is sparse, accelerator power may be unnecessarily wasted by supplying the accelerator with instructions that operate on sparse data and generate further sparse data that does not contribute to the overall results (e.g., sparse data that does not impact the overall learning or prediction of an AI system).

For example, due to non-linear (e.g., rectified linear device) activation and quantization, the inputs to each layer of a neural network may include many zero-valued elements. In some examples, matrices may be stored as "sparse matrices," used herein to refer to matrices in which only non-zero elements are explicitly defined. As a non-limiting example, sparse matrices may be stored in the form of two vectors, an order vector indicating which elements of a sparse matrix are populated (e.g., a bit-vector indicating a "1" value for non-zero entries and a "0" value for zero entries in a row, column lexicographic order) and a data vector including all of the non-zero elements (e.g., listed in the row, column lexicographic order). Storing and computing with sparse matrices may be particularly efficient when there are relatively few non-zero entries, because only the non-zero entries are explicitly defined. Accordingly, only the non-zero elements need to be stored, and in some cases, computations may be simplified or optimized based on the implicit encoding of the zero-valued elements (e.g., skipping a portion of a computation corresponding to computing the product of one or more values including one of the implicitly-encoded zero values). In some examples, sparse matrix data may be "unpacked" to populate a dense matrix, e.g., by explicitly storing all of the non-zero and zero elements indicated by the sparse matrix.

It is believed that much (although not necessarily all) of the data loaded from memory in many matrix computations is sparse. An accelerator that processes sparse data in the same way as it processes dense data may incur higher power costs performing computations on the sparse data that do not contribute to an overall end-result of the computation (e.g., unnecessarily multiplying zero-valued entries, resulting in zero-valued products that do not contribute any numerical weight to a result computed by a neural network). However, accelerators may be configured to handle dense matrices and sparse matrices separately, and may be unable to handle a mixture of dense and sparse data. In some examples, accelerators may be configured to unpack sparse matrices and process the data from the sparse matrices as dense matrix data. However, such unpacking and processing may incur an overly large energy expenditure due to unpacking, storing, and performing computations on all of the zero values in the sparse matrix. Accordingly, previous accelerators may be suboptimal at processing a mixture of dense and sparse matrix data. Similarly, specialized processing of sparse data may be inefficient at processing dense matrix data, as compared to accelerated dense matrix data computations.

Figure 1B:
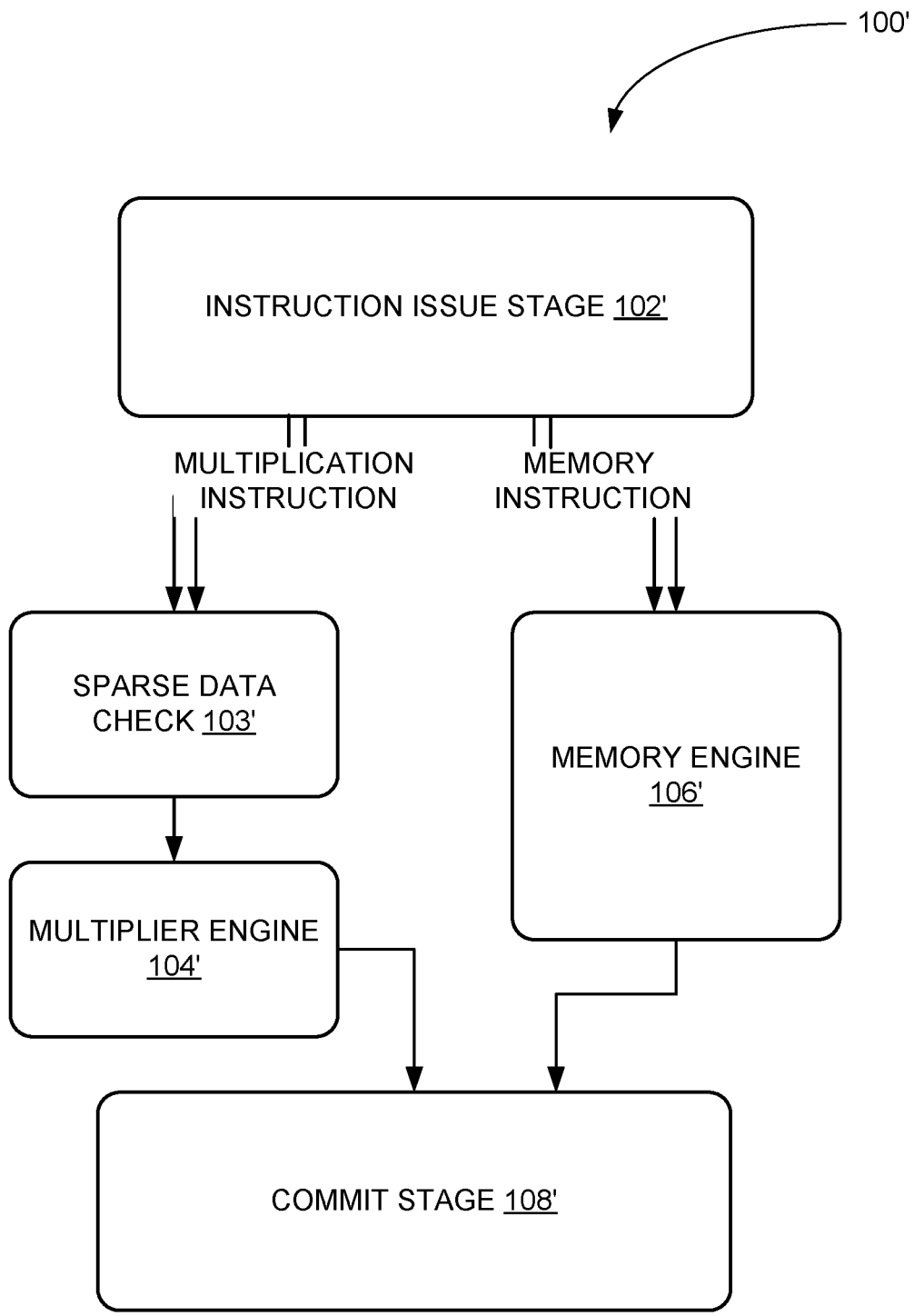

FIG. 1B shows an accelerator pipeline 100' that is configured to efficiently process a mixture of dense and sparse matrix data, for example to perform a matrix multiplication operation (or any other suitable matrix operation). As with pipeline 100, accelerator pipeline 100' is configured to process instructions received in an instruction issue stage 102' and eventually write out results in a commit stage 108'. However, accelerator pipeline 100' is configured to distinguish instructions that handle one or more sparse data operands, from instructions that handle only dense data. Accelerator pipeline 100' makes this distinction using a sparse data check device 103', which is configured to process the issued instructions (e.g., arithmetic and/or memory load/store operations) and operands thereof, as they are received at issue stage 102'. Sparse data check device 103' is configured to assess whether or not one or more operands of an instruction are sparse. As a non-limiting example, sparse data check device 103' may assess an operand to be sparse if it is a zero value. Then, based on such assessment by the sparse data check device 103', the multiplier engine 104' handles instructions that operate on dense data in a specialized dense data sub-pipeline. Multiplier engine 104 may be configured to handle instructions that operate on sparse data in a separate, specialized sparse data sub-pipeline.

In some examples, the separate, specialized sparse data sub-pipeline may be configured to perform a special operation configured for sparse data (e.g., an operation configured to process sparse data with reduced energy consumption, latency, and/or memory usage). As one non-limiting example, in an SA for matrix multiplication based on MAC nodes, the sparse data sub-pipeline may strategically ignore instructions on sparse data. It will be appreciated that in a matrix multiplication, a final result matrix is a sum of elementwise products from two input matrices. As such, if any element of an input matrix is sparse (e.g., a 0-valued element or an extremely small element), then all of the elementwise products involving that element will be sparse (e.g., 0 or a value close to 0) and will not substantially contribute to a final sum in the result matrix. As such, for a matrix multiplication operation, a sparse data sub-pipeline may simply ignore instructions that operate on sparse data. Nevertheless, the multiplier engine 104' may compute accurate final result matrices, since all the instructions operating on dense data (which actually contribute to the final result) are handled in the dense data sub-pipeline. Other accelerated computations (e.g., other matrix computations) may have similar sparsity properties enabling the sparse data sub-pipeline to substantially ignore incoming instructions (e.g., by replacing at least a portion of incoming instructions with no-op instructions). For example, a neural network computation may be implemented as a sum-of-products computation similar to a matrix multiplication (e.g., a tensor multiplication), which may enable instructions operating on sparse data to be ignored as they may not contribute to a final result of the computation.

The accelerator pipeline 100' may achieve reduced energy consumption relative to sequential processing of dense and/or sparse matrices, as well as relative to specialized accelerators for dense or sparse matrices (e.g., relative to a simpler accelerator pipeline 100 for dense matrices). As indicated by the double-arrows for multiplication instructions and memory instructions going from instruction issue stage 102' to sparse data check device 103' and memory engine 106', the instruction issue bandwidth for the accelerator pipeline 100' is increased (e.g., relative to previous accelerators) to enable the accelerator pipeline to process a large number of issued instructions. For example, the accelerator may process dense instructions and sparse instructions simultaneously in the specialized dense sub-pipeline and specialized sparse sub-pipeline, respectively. In some examples, the accelerator pipeline may be configured to feed an accelerator with more instructions than the accelerator can process (e.g., the accelerator pipeline may "over-provision" the accelerator), thereby allowing the accelerator to proceed with processing instructions that do not have sparse instructions, and buffering remaining instructions into an efficient on-chip memory for future processing (e.g., to take advantage of sparsity).

Figure 2:
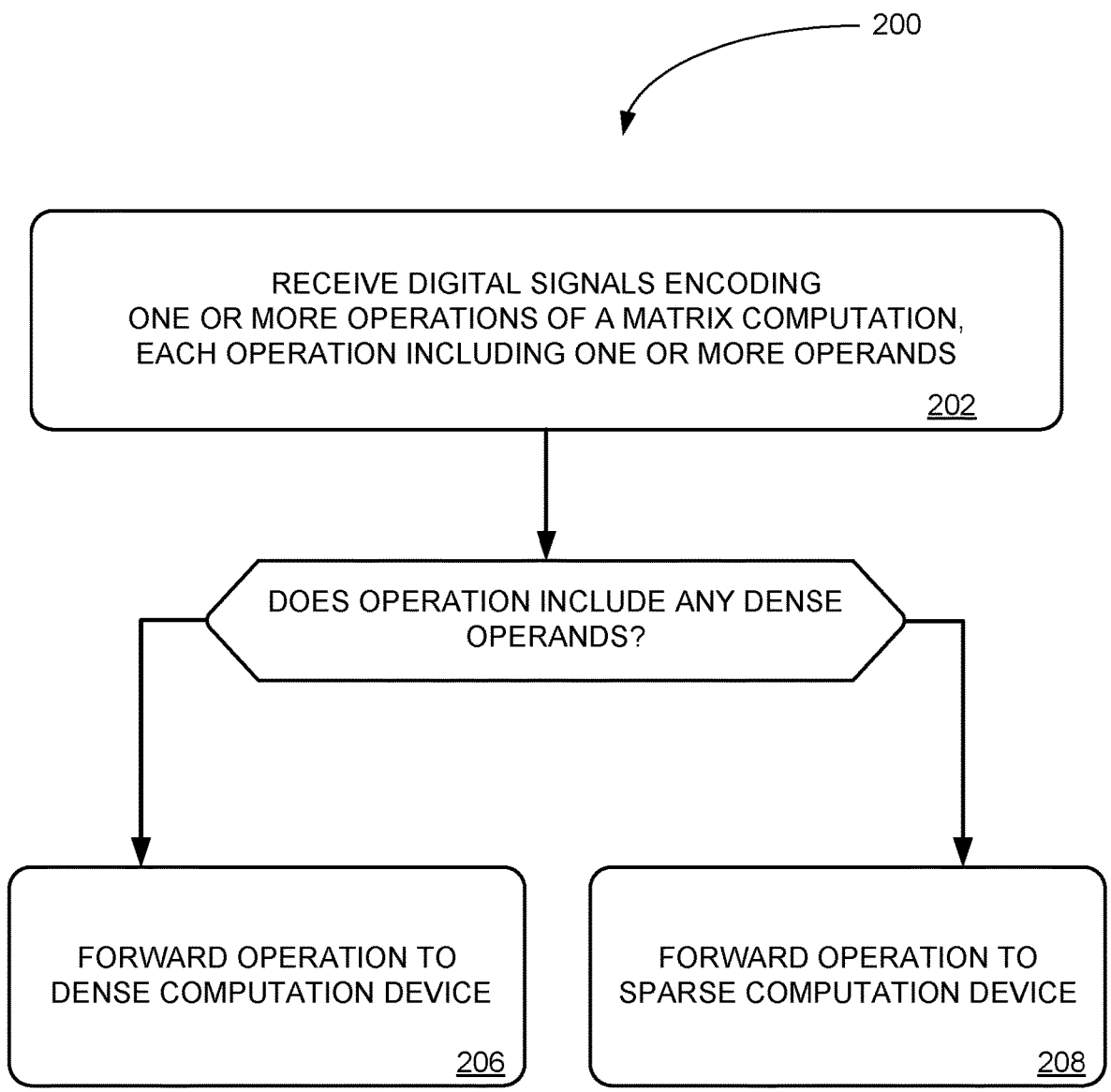
FIG. 2 shows a method of increasing computer hardware efficiency of a matrix computation.

FIG. 2 shows an exemplary method for increasing the hardware efficiency of a matrix computation in an accelerator pipeline (e.g., accelerator pipeline 100 or 100').

Figure 3:
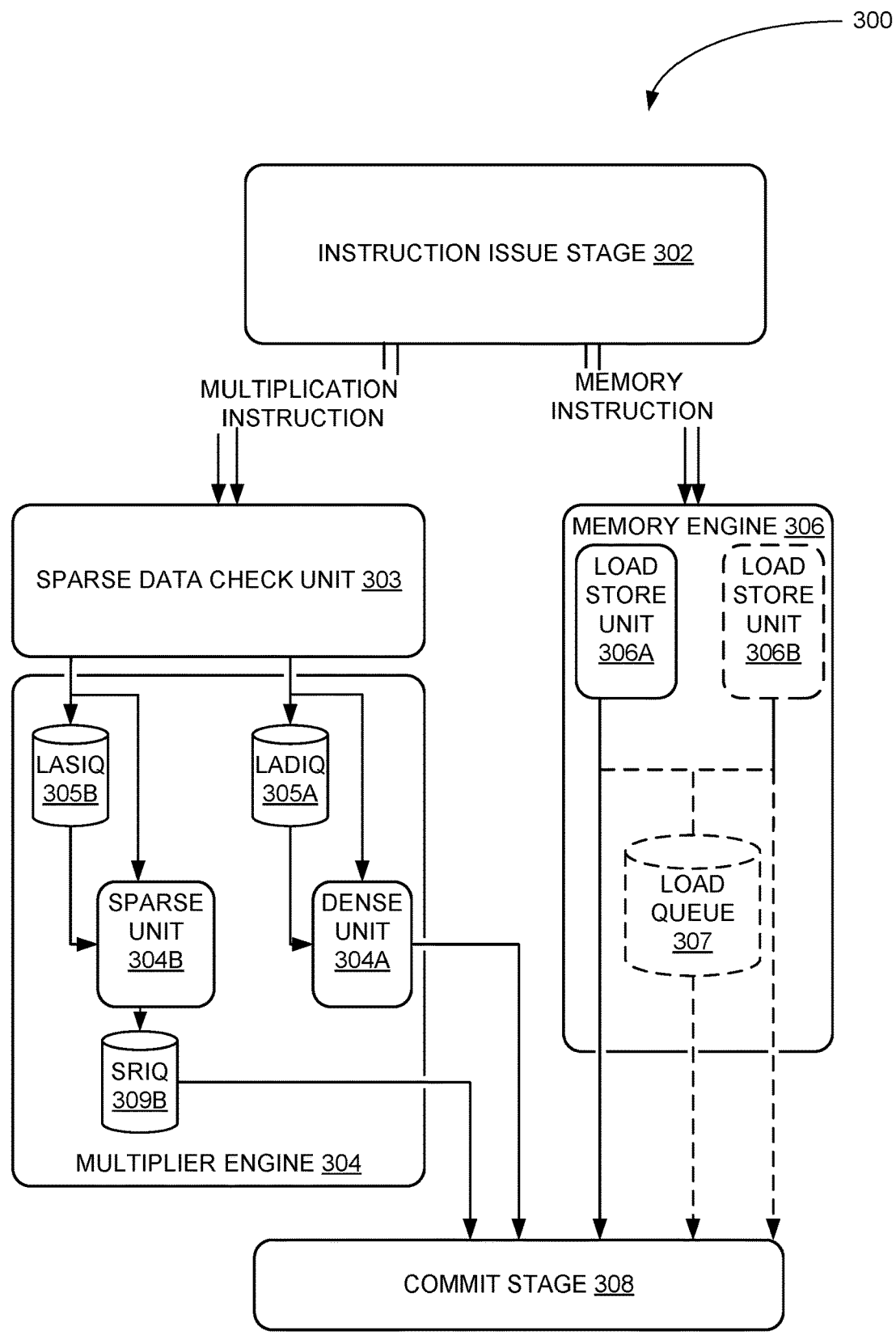
FIG. 3 shows an exemplary microarchitecture for an accelerator for performing matrix computations on sparse and/or dense matrix data.

FIG. 3 shows a non-limiting example of a microarchitecture 300 for accelerator pipelines (e.g., for accelerator pipeline 100 or 100'). Microarchitecture 300 is configured to increase the hardware efficiency of a matrix computation including a plurality of matrix operations. As a non-limiting example, microarchitecture 300 may be configured to implement method 200.

At 202, method 200 includes receiving, at a computer processing device, digital signals encoding one or more operations of the matrix computation, each operation including one or more operands. For example, the digital signals may encode a matrix multiplication and/or a neural network computation, as described above. Non-limiting examples of digital signals for encoding a matrix operation include computer-readable instructions, machine code, assembly code, bytecode, source code, etc.

At 204, method 200 includes determining, by a sparse data check device of the computer processing machine, whether an operation of the matrix computation includes all dense operands. Operands of a matrix computation are either sparse or dense. For example, sparse operands may include zero-valued operands and/or operands with a value less than a threshold value. Accordingly, the sparse data check device may be configured to perform any suitable operations (e.g., arithmetic operations) to determine whether or not each operand of the operation is sparse or dense.

At 206, responsive to determining that the operation of the matrix computation includes all dense operands, method 200 includes forwarding the operation to a dense computation device of the computer processing machine configured to perform the operation of the matrix computation based on the dense operands. At 208, responsive to determining that the operation of the matrix computation includes one or more sparse operands, method 200 includes forwarding the operation to a sparse computation device configured to perform the operation of the matrix computation. Accordingly, operations that involve any sparse operands may be efficiently handled by the sparse computation device. Furthermore, all of the operations issued to the dense computation device involve all dense operations, so the dense computation device does not unnecessarily use any computational resources performing arithmetic operations that are associated with sparse results. For example, the dense computation device may perform arithmetic operations exclusively on non-zero data, thereby eliminating unnecessary latency and/or energy expenditure associated with explicitly performing operations such as multiplying by zero (which always results in a product of zero regardless of other operands) and/or adding zero (which is equivalent to a no-op).

Microarchitecture 300 is configured to process instructions (e.g., digital signals encoding a matrix operation) received in an instruction issue stage 302 and eventually write out results in a commit stage 308. Microarchitecture 300 is configured to receive incoming instructions at instruction issue stage 302. As indicated by the double-arrows and as with accelerator pipeline 200, the bandwidth may accommodate simultaneously processing incoming multiplication and/or memory instructions. Microarchitecture 300 may enable efficient accelerated matrix computations, irrespective of exactly what program is being accelerated using microarchitecture 300 (e.g., microarchitecture 300 provides energy saving, latency, and/or throughput benefits that are agnostic to the particular matrix-processing, AI, ML, and/or neural network program and/or data).

Method 200 and/or microarchitecture 300 may be utilized for various matrix computations. For example, method 200 and/or microarchitecture 300 may be utilized to improve hardware efficiency of matrix multiplications (e.g., using a dense computation device configured to perform a multiply-and-accumulate operation), As another non-limiting example, method 200 and/or microarchitecture 300 may be utilized to improve hardware efficiency of neural network computations.

Sparse data check device 303 is configured to distinguish instructions on sparse data from instructions on dense data. For example, sparse data check device 303 may recognize sparse data based on an instruction referring to one or more zero-valued operands, based on a pre-defined tag associated with the data and/or instruction, or in any other suitable manner. As an example, a multiplication instruction involving one or more zero-valued operands (and optionally near-zero-valued operands) may be considered sparse, since any value multiplied by 0 results in a product of 0 (or near zero in the case of multiplication by a near-zero-valued operand).

In some examples, sparse data check device 303 is configured to determine whether operands are sparse or dense based on determining a zero-valued operand to be sparse and a non-zero valued operand to be dense. In other examples, sparse data check device 303 is configured to determine whether operands are sparse or dense based on determining an operand to be dense if the operand's value exceeds a pre-defined threshold and sparse if the operand's value does not exceed the pre-defined threshold. For example, sparse data check device 303 may be configured to recognize sparse data based on an instruction referring to one or more operands having a value less than a sparsity threshold value.

As an example, the sparsity threshold value may be selected based on how the instruction is being used in an overall computation. For example, the sparsity threshold value for a matrix multiplication may be a minimum factor size, where smaller factors are expected to result in product values that would be unlikely to substantially affect a final result of a computation. For example, the sparsity value may be a small floating-point number such as 0.001, 0.00001, 0.0000001, etc. In some examples, the sparsity value may be a tunable value (e.g., a hardware hyperparameter of the sparse data check device 303). For example, the sparsity value may be re-defined before and/or during a computation, so as to reduce energy, latency, and/or memory costs associated with the computation. As an example, the threshold sparsity value may be optimized so as to reduce energy costs by treating a large proportion of instruction operands as sparse, while being constrained based on an accuracy criterion for computations. As a non-limiting example, for a matrix multiplication computation, the threshold sparsity value may be selected based on an expected distribution of input data matrices so as to reduce costs, while ensuring at most a threshold deviation in accuracy of matrix products for matrixes drawn from the expected distribution. As another non-limiting example, for a neural network computation, the threshold sparsity value may be selected based on treating as much of the computation as possible as sparse to reduce costs, while maintaining at least a threshold average prediction accuracy. By tuning appropriate threshold sparsity values, sparse data check device 303 may enable reduced costs (e.g., power, memory, and/or latency) for carrying out a wide variety of computations that involve sparse operands. The above examples are non-limiting, and threshold sparsity values may be selected based on any suitable criterion. As an example, in a matrix computation that accumulates a maximum value, a large negative value may be considered sparse as it may be impossible or unlikely for such large negative value to be a maximum value. As another example, in a matrix computation that accumulates a product of a plurality of factors, a value near 1 may be considered sparse as multiplication by a value close to 1 would not substantially change a final product result. Instructions that operate on sparse data are processed by a sparse computation device 304B along with a lookahead sparse instruction queue (LASIQ) 305B and a sparse register identifier queue (SRIQ) 309B. Instructions that operate on dense data are processed by a dense computation device 304A along with a lookahead dense instruction queue (LADIQ) 305A.

While checking for data sparsity is described herein with regard to operands being sparse when they are zero values or near-zero values, in other implementations, sparse data check device 303 may be configured to sort computer operations (e.g., such as steps of a matrix computation) based on other suitable criteria with regard to the operand of such operations. Accordingly, the sorted computations may be suitably forwarded to a dense computation device configured to perform a computer operation and to a sparse computation device configured to perform the same computer operation with a lower computational cost. For example, the sparse computation device may utilize a property of the sorted data which is passed to the sparse computation device (analogous to the utilization of sparsity to more efficiently perform matrix computations as described herein).

In some examples, instructions are forwarded to the dense computation device 304A by enqueuing any instructions that have all dense operands into the LADIQ 305A. Accordingly, the dense computation device 304A may be configured to execute instructions from the LADIQ 305A in order. In some examples, LADIQ 305A may be fed with instructions in an excess of a number of instructions the dense computation device 304A is configured to process in a subsequent cycle. For example, based on an instruction bandwidth, throughput, and/or latency of computing resources associated with dense computation device 304A, dense computation device 304A may only be able to perform a limited number of arithmetic operations within a cycle. Accordingly, when LADIQ 305A is kept full and instructions are forwarded from LADIQ 305A, dense computation device 304A may process a maximal number of instructions in a plurality of subsequent cycles. For example, using LADIQ 305A to supply instructions to the execution engine may enable dense computation device 304A to complete portions of a matrix computation, independently of any waiting that may be incurred due to receiving digital signals specifying operand data, while checking operand data for sparsity in sparse data check device 303, and/or while sparse data is being processed by sparse computation device 304A.

Similarly, in some examples, instructions are forwarded to the sparse computation device 304B by enqueuing any instructions that have one or more sparse operands into the LASIQ 305B. In some examples, sparse computation device 304B is configured to automatically store sparse result values in SRIQ 309B, in a program order. For example, sparse computation device 304B may recognize, for each sparse instruction a location associated with a result value of the instruction, in order to automatically write a zero value into register file for each sparse instruction. In some examples, LASIQ 305B may be fed with instructions in excess of a number of instructions the sparse computation device is configured to process in a subsequent cycle. For example, LASIQ 305B may be supplied with a large plurality of instructions with sparse results that may be replaced with no-ops and/or used to automatically derive locations for storing sparse result values. Accordingly, computations associated with the sparse results may be skipped (e.g., replaced with no-ops) and/or deferred (e.g., enqueued for writing a sparse result value at a later time). As a large plurality of instructions are processed by sparse computation device 303, LADIQ 305A and/or LASIQ 305B may be kept at and/or near full capacity, thereby allowing efficient, concurrent progress at sparse and/or dense portions of a matrix computation.

Sparse data check device 303 is generally configured to process all available issued instructions to sort such instructions into sets of sparse and/or dense instructions for processing. Accordingly, the instructions may be processed immediately by sparse computation device 304B or dense computation device 304A. Alternately or additionally, as instructions are processed, such instructions may be enqueued into LASIQ 305B and/or LADIQ 305A for subsequent processing by sparse computation device 304B and/or dense computation device 304A respectively. As will be described below, the LASIQ 305B, LADIQ 305A, and SRIQ 309B permit the sparse data check device 303, sparse computation device 304B, and dense computation device 304A to concurrently process a plurality of incoming instructions, while ensuring that the results of processing the instructions occur in a correct order (e.g., in program order). In some examples, the sparse computation device 304B may be a shorter-latency pipeline relative to the dense computation device 304A pipeline (e.g., sparse computation device 304B may be implemented using a specialized processing technique that is suitable for sparse matrices, so as to avoid redundant/unnecessary computations on zero elements).

Sparse computation device 304B is a smaller/shorter pipeline (e.g., having fewer computational steps, smaller power draw, and/or lower latency) compared to dense computation device 304A. In some examples, sparse computation device 304B may substantially ignore incoming instructions that have been detected as sparse (e.g., as such instructions on sparse data may effectively not impact a final result of an overall computation).

For example, the sparse computation device 304B may not actually multiply values, for example, the sparse computation device 304B may replace multiplications of sparse data with no-op instructions. Even when no multiplication is performed, sparse computation device 304B may determine where to store non-zero elements for later processing, without performing any actual multiplication and while ignoring zero elements, so that the non-zero elements may be handled later. In other examples, the sparse computation device 304B may perform a sparsity-optimized multiplication to efficiently multiply the values while ignoring zero elements. As an example, sparse computation device 304B may be configured to ignore specific operands of all incoming instructions, but for each incoming instruction, to compute a memory address at which to automatically write a sparse value (e.g., a constant 0 value representing an expected result from an instruction on one or more sparse operands). Accordingly, sparse computation device 304B may be able to efficiently determine all such memory addresses at which to write sparse values (e.g., constant 0 values), without actually performing any arithmetic on incoming operands. Accordingly, the sparse computation device 304B computes all of the sparse values resulting from the instructions on sparse data, while reducing energy, time, and/or memory costs since there is no need to process specific results. In some examples, it may not even be necessary to explicitly track results of sparse instructions (e.g., for a sum-of-products, products equaling 0 may be entirely omitted from the final sum). In any case, the sparse computation device 304B is configured to determine an order and/or location to write results of instructions on sparse data, when any such results need to be tracked for an overall computation. In some examples, sparse computation device 304B is configured to compute an intermediate result of a matrix computation having one or more sparse operands by automatically assuming a sparse result value. For example, in a matrix multiplication, when a zero-valued element occurs in an input matrix, one or more intermediate results of the matrix computation are necessarily zero-valued based on having the zero-valued element as a factor. Accordingly, sparse computation device 304B may be configured to automatically compute intermediate results associated with sparse operands by writing zero-valued results into associated locations in a product matrix representing the result of the computation. For example, when zero-valued operands occur, entire rows and/or columns may be automatically assumed to have a sparse result. Accordingly, sparse computation device 304B may efficiently and automatically write all such sparse results without needing to perform specific computations on the operands. In some examples, sparse computation device 304B may be configured to replace an executable instruction of an operation with a no-op instruction. For example, operations to perform specific multiplication and/or addition steps in a matrix multiplication operation may be replaced with a no-op instruction, since an addition of a result value is mathematically equivalent to a no-op.

For example, as shown in FIG. 3, sparse computation device 304B is configured to keep track of a sparse instruction identifier for each instruction on sparse data, along with an output register for that instruction, within the Sparse Register Identifier Queue (SRIQ 309B). In turn, the SRIQ 309B is configured to forward a given instruction to the commit stage after all instructions that issued before the given instruction have committed. Furthermore, the SRIQ 309B is configured to forward the corresponding register's value to the register file. In some implementations, the SRIQ 309B guarantees that instructions are retired (i.e., completed) in program-order, thereby ensuring correct results of the matrix computation. In other words, the sparse computation device may be configured to forward instruction identifiers to the SRIQ 309B, and accordingly the SRIQ may be configured to write corresponding results according to a program-order associated with the instruction identifiers. Accordingly, the computational work of storing sparse values resulting from operations on sparse data may be skipped, deferred, and/or efficiently implemented by SRIQ 309B.

Sparse data check device 303 is configured to forward instructions to the sparse computation device 304B and/or dense computation device 304A when these computation devices are available to process instructions. For example, if a series of instructions issued during a cycle (e.g., all instructions in the cycle or a portion of the instructions in the cycle) are all instructions on dense data, a first instruction (e.g., a "youngest" or most recently-issued instruction) may be fed into the dense computation device 304A for processing. Furthermore, any other instructions on dense data may be buffered into the LADIQ 305A. For example, the LADIQ 305A may be an on-chip queue of any suitable size. Similarly, if a series of instructions issued during a cycle have sparse data values, a first instruction may be fed into the sparse computation device 304B, and other instructions on sparse data may be buffered into the LASIQ 305B. As with the LADIQ 305A, the LASIQ 305B may be an on-chip queue of any suitable size. In a subsequent cycle, the next instruction in the LADIQ 305A may be fed into the dense computation device 304A, and/or the next instruction in the LASIQ 305B may be fed into the sparse computation device 304A. Instructions are processed from instruction issue stage 302 as long as there is room in both of the LASIQ 305B and the LADIQ 305A. At the instruction issue stage 302, accelerator microarchitecture 300 has not yet determined whether issued instructions operate on dense or sparse data. As such, the accelerator microarchitecture uses the LASIQ 305B and LADIQ 305A to enqueue incoming operations to ensure that any incoming operation may be processed and/or enqueued (e.g., even if part of the pipeline such as sparse computation device 304B or dense computation device 304A is too busy to handle further instructions immediately). Accordingly, if either of the LASIQ 305B or the LADIQ 305A is completely full, the instruction issue stage 302 is configured to stop issuing new instructions until there is room in both queues.

As described above, the issue bandwidth for multiplication instructions may be increased, e.g., to enable concurrently enqueuing and/or processing instructions on sparse and dense data simultaneously. Furthermore, the memory instruction issue bandwidth may be similarly increased, to facilitate loading data from memory for the multiplication instructions. As a non-limiting example, the memory instruction bandwidth may be increased by increasing a bandwidth of a load store device 306A of the memory engine 306. Alternately or additionally, as another non-limiting example, the memory instruction bandwidth may be increased by adding one or more additional load store devices 306B. In some examples, when two or more load store devices are used, a load queue 307 may be used to enqueue memory load results so as to ensure that load instructions are retired (e.g., completed) in program order. For example, although not typically used in accelerator hardware, load queues may be used in superscalar computational pipelines to ensure program-order loading of data from memory.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources. As another non-limiting example, accelerator pipeline 100' and/or microarchitecture 300 may be present in a computing system as logic subsystem(s) (e.g., processor and/or co-processor devices) for performing any suitable computation (e.g., for matrix multiplications).

Figure 4:
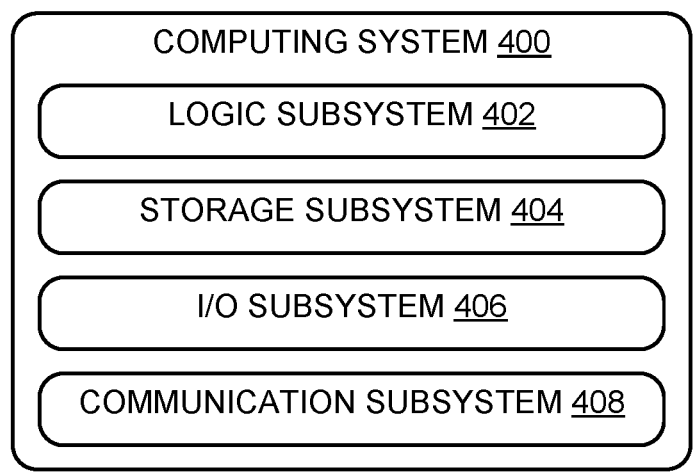
FIG. 4 shows an exemplary computing system.

FIG. 4 schematically shows a simplified representation of a computing system 400 configured to provide any to all of the compute functionality described herein. Computing system 400 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices. As a non-limiting example, computing system 400 may implement an accelerator pipeline 100 or accelerator pipeline 100'. As another non-limiting example, computing system 400 may include a microarchitecture 300. As another non-limiting example, computing system 400 may implement method 200.

Computing system 400 includes a logic subsystem 402 and a storage subsystem 404. Computing system 400 may optionally include an input/output subsystem 406, communication subsystem 408, and/or other subsystems not shown in FIG. 4. For example, logic subsystem 402 may include accelerator pipeline 100' and/or microarchitecture 300.

Logic subsystem 402 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 404 includes one or more physical devices configured to temporarily and/or permanently hold computer information such as data and instructions executable by the logic subsystem. When the storage subsystem includes two or more devices, the devices may be collocated and/or remotely located. Storage subsystem 404 may include volatile, nonvolatile, dynamic, static, read/write, read-only, random-access, sequential-access, location-addressable, file-addressable, and/or content-addressable devices. Storage subsystem 404 may include removable and/or built-in devices. When the logic subsystem executes instructions, the state of storage subsystem 404 may be transformed—e.g., to hold different data.

Aspects of logic subsystem 402 and storage subsystem 404 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example. As a non-limiting example, accelerator microarchitecture 300, instruction issue stage 302, sparse data check device 303, LASIQ 305B, LADIQ 305A, sparse computation device 304B, dense computation device 304A, SRIQ 309B, memory engine 306, load store device 306A, load store device 306B, load queue 307, and/or commit stage 308 may each be implemented via any suitable combination of hardware-logic components. In some examples, a hardware accelerator may have a limited on-chip memory capacity with a low access latency (e.g. "fast memory"). If a workload for the accelerator exceeds the size of on-chip memory, remote slower memory can be used to buffer extraneous data. However, this may substantially reduce the speed of processing the workload. Nevertheless, the techniques disclosed herein may enable efficient on-chip processing of matrix calculations (e.g., by reducing latency, power consumption, and/or on-chip storage requirements to hold zero values of sparse data), thereby mitigating potential consequences of limited on-chip memory. Nonetheless, it is to be understood that the herein described techniques are beneficial even when abundant on-chip memory is available.

The logic subsystem and the storage subsystem may cooperate to instantiate one or more logic machines and/or engines. As used herein, the terms "machine" and "engine" are used to collectively refer to the combination of hardware, firmware, software, instructions, and/or any other components cooperating to provide computer functionality. In other words, "machines" and/or "engines" are never abstract ideas and always have a tangible form. A machine and/or engine may be instantiated by a single computing device, or may include two or more sub-components instantiated by two or more different computing devices. In some implementations a machine and/or engine includes a local component (e.g., software application executed by a computer processor) cooperating with a remote component (e.g., cloud computing service provided by a network of server computers). The software and/or other instructions that give a particular machine and/or engine its functionality may optionally be saved as one or more unexecuted modules on one or more suitable storage devices. As a non-limiting example, accelerator microarchitecture 300, instruction issue stage 302, sparse data check device 303, LASIQ 305B, LADIQ 305A, sparse computation device 304B, dense computation device 304A, SRIQ 309B, memory engine 306, load store device 306A, load store device 306B, load queue 307, and/or commit stage 308 may be implemented as machines/engines according to the present disclosure.

Machines/engines may be implemented using any suitable combination of state-of-the-art and/or future machine learning (ML), artificial intelligence (AI), and/or natural language processing (NLP) techniques. Alternately or additionally, machines/engines described in the present disclosure may be used as components in an implementation of ML, AI, and/or NLP techniques. As a non-limiting example, matrix computations (e.g., matrix multiplication) may be used in an implementation of a neural network. Accordingly, accelerator microarchitecture 300 may be used to efficiently perform such matrix computations. Non-limiting examples of ML, AI, and/or NLP techniques include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or supersegmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method of increasing computer hardware efficiency of a matrix computation comprises: receiving, at a computer processing device, digital signals encoding one or more operations of the matrix computation, each operation including one or more operands; responsive to determining, by a sparse data check device of the computer processing machine, that an operation of the matrix computation includes all dense operands, forwarding the operation to a dense computation device of the computer processing machine configured to perform the operation of the matrix computation based on the dense operands; and responsive to determining, by the sparse data check device, that the operation of the matrix computation includes one or more sparse operands, forwarding the operation to a sparse computation device configured to perform the operation of the matrix computation. In this or any other example, the sparse data check device is configured to determine whether operands are sparse or dense based on determining a zero-valued operand to be sparse and a non-zero valued operand to be dense. In this or any other example, the sparse data check device is configured to determine whether operands are sparse or dense based on determining an operand to be dense if a value of the operand exceeds a pre-defined threshold and sparse if the value of the operand does not exceed the pre-defined threshold. In this or any other example, the pre-defined threshold is a hardware hyperparameter of the sparse data check device. In this or any other example, the matrix computation is a matrix multiplication. In this or any other example, the dense computation device is configured to perform a multiply-and-accumulate operation. In this or any other example, the matrix computation is a neural network computation. In this or any other example, the sparse computation device is configured to automatically save a sparse result value to a location derived from the operation of the matrix computation. In this or any other example, the sparse computation device is configured to replace an executable instruction of the operation with a no-op instruction. In this or any other example, forwarding the operation having all dense operands to the dense computation device includes enqueuing the operation having all dense operands into a lookahead dense instruction queue, wherein the dense computation device is configured to execute operations from the lookahead dense instruction queue in order. In this or any other example, the method further comprises feeding the lookahead dense instruction queue in excess of a number of operations the dense computation device is configured to process in a subsequent cycle. In this or any other example, forwarding the operation having one or more sparse operands to the sparse computation device includes enqueuing the operation having one or more sparse operands into a lookahead sparse instruction queue. In this or any other example, the sparse computation device is configured to automatically store sparse result values from operations in the lookahead sparse instruction queue, in a program order of the operations in the lookahead sparse instruction queue. In this or any other example, the method further comprises feeding the lookahead sparse instruction queue in excess of a number of operations the sparse computation device is configured to process in a subsequent cycle.

In an example, a computer system for performing matrix computations, comprises: a sparse computation device configured to calculate a result of an operation having one or more sparse operands; a dense computation device configured to calculate a result of an operation having all dense operands; an instruction issue stage configured to receive digital signals encoding one or more operations of a matrix computation; and a sparse data check device configured to forward an operation having one or more sparse operands to the sparse computation device, and to forward an operation having all dense operands to the dense computation device. In this or any other example, the sparse data check device is configured to determine an operand is dense if a value of the operand is greater than the pre-defined threshold, and configured to determine the operand is sparse if the value of the operand is less than the pre-defined threshold. In an example, a computer system for performing matrix computations comprises: a sparse computation unit configured to perform a matrix computation on sparse data; a dense computation unit configured to perform the matrix computation on dense data; an instruction issue stage configured to receive a plurality of instructions including an instruction operating on sparse data and an instruction operating on dense data; and a sparse data check device configured to distinguish between instructions operating on sparse data and instructions operating on dense data, wherein the sparse data check device is further configured to forward instructions determined to operate on sparse data to the sparse computation device and to forward instructions determined to operate on dense data to the dense computation device In this or any other example, the sparse data check device is configured to detect a plurality of instructions operating on sparse data and enqueue the plurality of instructions operating on sparse data into a lookahead sparse instruction queue. In this or any other example, the sparse data check device is configured to detect a plurality of instructions operating on dense data and enqueue the plurality of instructions operating on dense data into a lookahead dense instruction queue. In this or any other example, the sparse computation device is configured to forward instruction identifiers to a sparse register identifier queue, and the sparse register identifier queue is configured to write corresponding results according to a program-order associated with the instruction identifiers.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of increasing computer hardware efficiency of a matrix computation, comprising:
receiving, at a computer processing device, digital signals encoding one or more operations of the matrix computation, each operation including one or more operands;
responsive to determining, by a sparse data check device of the computer processing machine, that an operation of the matrix computation includes all dense operands, forwarding the operation to a dense computation device of the computer processing machine configured to perform the operation of the matrix computation based on the dense operands; and
responsive to determining, by the sparse data check device, that the operation of the matrix computation includes one or more sparse operands, forwarding the operation to a sparse computation device configured to perform the operation of the matrix computation.

2. The method of claim 1, wherein the sparse data check device is configured to determine whether operands are sparse or dense based on determining a zero-valued operand to be sparse and a non-zero valued operand to be dense.

3. The method of claim 1, wherein the sparse data check device is configured to determine whether operands are sparse or dense based on determining an operand to be dense if a value of the operand exceeds a pre-defined threshold and sparse if the value of the operand does not exceed the pre-defined threshold.

4. The method of claim 3, wherein the pre-defined threshold is a hardware hyperparameter of the sparse data check device.

5. The method of claim 1, wherein the matrix computation is a matrix multiplication.

6. The method of claim 1, wherein the dense computation device is configured to perform a multiply-and-accumulate operation.

7. The method of claim 1, wherein the matrix computation is a neural network computation.

8. The method of claim 1, wherein the sparse computation device is configured to automatically save a sparse result value to a location derived from the operation of the matrix computation.

9. The method of claim 1, wherein the sparse computation device is configured to replace an executable instruction of the operation with a no-op instruction.

10. The method of claim 1, wherein forwarding the operation having all dense operands to the dense computation device includes enqueuing the operation having all dense operands into a lookahead dense instruction queue, wherein the dense computation device is configured to execute operations from the lookahead dense instruction queue in order.

11. The method of claim 10, further comprising feeding the lookahead dense instruction queue in excess of a number of operations the dense computation device is configured to process in a subsequent cycle.

12. The method of claim 1, wherein forwarding the operation having one or more sparse operands to the sparse computation device includes enqueuing the operation having one or more sparse operands into a lookahead sparse instruction queue.

13. The method of claim 12, wherein the sparse computation device is configured to automatically store sparse result values from operations in the lookahead sparse instruction queue, in a program order of the operations in the lookahead sparse instruction queue.

14. The method of claim 12, further comprising feeding the lookahead sparse instruction queue in excess of a number of operations the sparse computation device is configured to process in a subsequent cycle.

15. A computer system for performing matrix computations, including:
a sparse computation device configured to calculate a result of an operation having one or more sparse operands;
a dense computation device configured to calculate a result of an operation having all dense operands;
an instruction issue stage configured to receive digital signals encoding one or more operations of a matrix computation; and
a sparse data check device configured to forward an operation having one or more sparse operands to the sparse computation device, and to forward an operation having all dense operands to the dense computation device.

16. The computer system of claim 15, wherein the sparse data check device is configured to determine an operand is dense if a value of the operand is greater than the pre-defined threshold, and configured to determine the operand is sparse if the value of the operand is less than the pre-defined threshold.

17. A computer system for performing matrix computations, including:
a sparse computation unit configured to perform a matrix computation on sparse data;
a dense computation unit configured to perform the matrix computation on dense data;
an instruction issue stage configured to receive a plurality of instructions including an instruction operating on sparse data and an instruction operating on dense data; and
a sparse data check device configured to distinguish between instructions operating on sparse data and instructions operating on dense data, wherein the sparse data check device is further configured to forward instructions determined to operate on sparse data to the sparse computation device and to forward instructions determined to operate on dense data to the dense computation device.

18. The computer system of claim 17, wherein the sparse data check device is configured to detect a plurality of instructions operating on sparse data and enqueue the plurality of instructions operating on sparse data into a lookahead sparse instruction queue.

19. The computer system of claim 17, wherein the sparse data check device is configured to detect a plurality of instructions operating on dense data and enqueue the plurality of instructions operating on dense data into a lookahead dense instruction queue.

20. The computer system of claim 17, wherein the sparse computation device is configured to forward instruction identifiers to a sparse register identifier queue, and the sparse register identifier queue is configured to write corresponding results according to a program-order associated with the instruction identifiers.

* * * * *